Jan. 30, 1962

C. E. SAUNDERS 3,019,197

CATALYST FOR THE DECOMPOSITION OF HYDROGEN PEROXIDE
AND METHOD OF PREPARING SAID CATALYST

Filed Oct. 7, 1949

Inventor
C. E. SAUNDERS

By M. O. Hayes

Attorney

United States Patent Office 3,019,197
Patented Jan. 30, 1962

3,019,197
CATALYST FOR THE DECOMPOSITION OF HYDROGEN PEROXIDE AND METHOD OF PREPARING SAID CATALYST
Charles E. Saunders, Washington, D.C.
(416 Valley Lane, Falls Chuch, Va.)
Filed Oct. 7, 1949, Ser. No. 120,209
5 Claims. (Cl. 252—477)
(Granted under Title 35, U.S. Code (1952), sec. 266)

The present invention relates to a catalyst for the decomposition of hydrogen peroxide. More particularly, the invention relates to a catalyst which is particularly well suited for the decomposition of hydrogen peroxide when used in the propulsion systems of torpedoes, submarines, or the like.

Prior art catalysts have proven unsatisfactory for the reasons of poor starting, production of large quantities of debris, short life, and erratic operation. A particular prior art catalyst is formed by mixing selenium, lead, lead oxide, and calcium permanganate powders in various ratios followed by pelleting and ignition. The resultant material gives quick decomposition with the disadvantage, however, of short life due to the leaching out of the active ingredient (soluble permanganate). This material, also, is not capable of supporting decomposition at high flow rates and considerable debris resulted therefrom.

Another form of prior art catalyst in which a porous ceramic material is impregnated with calcium permanganate possesses the same characteristics as the first mentioned prior art arrangement.

A further prior art catalyst is in the form of a rough cobalt plating on a copper screen, followed by dipping in a solution of silver nitrate, the purpose of this treatment being to form a film of silver and silver oxide which activates the cobalt. This catalyst has been found to perform erratically, its starting ability being affected by temperature to such an extent that explosions have occurred due to the accumulation of large quantities of hydrogen peroxide in an undecomposed state followed by violent decomposition. This arrangement, also, produces a large amount of debris and is not capable of supporting decomposition at low temperatures.

Other catalysts include pure silver and silver plated screens activated with silver nitrate. While these arrangements have poor starting characteristics, they become extremely active after decomposition has been initiated.

The catalyst of the present invention substantially obviates the disadvantages of the prior art, while retaining the advantages thereof, by providing the characteristics of good starting, freedom from detrimental debris, a high degree of efficiency during long periods of operation, and successful starting at low temperatures.

It has been found that in the use of permanganates as catalysts the initial activity is particularly good at the start of decomposition of the hydrogen peroxide when the temperature within the decomposition chamber is low. Permanganates have the disadvantage, however, of short life and erratic behavior when the normal operating temperature within the decomposition chamber is reached during the decomposition of hydrogen peroxide.

In order to prevent the aforementioned disadvantageous results and at the same time secure the advantages of good starting at low temperatures it has been found that a combination of metal permanganate and silver is advantageous. The silver is arranged in such a manner as to be initially covered by the permanganate and to be gradually exposed during the starting period to thereafter support decomposition as it becomes oxidized. Silver oxide and manganese dioxide, which is also formed during decomposition, have good operating characteristics when subjected to the high temperatures encountered during decomposition of hydrogen peroxide, the silver oxide being particularly advantageous in that it has long life combined with good operating characteristics at high temperatures. With this arrangement, substantially complete decomposition is obtained throughout the entire period of decomposition, the decomposed material being free of debris which might have a detrimental effect on mechanical equipment with which it is employed.

In the present invention a steel screen is electroplated with silver in such a manner as to produce a porous coating thereon. The plated screen is coated with a permanganate such, for example as potassium permanganate. In this way quick starting of decomposition is accomplished through the use of the permanganate and during the starting operation the permanganate is gradually dissolved thereby forming a more intimate contact with the hydrogen peroxide. The permanganate adjacent the silver forms manganese dioxide which, when the permanganate has been dissolved, is exposed and continues the catalytic action. It has also been found during long runs that a certain portion of the manganese dioxide wears away thereby exposing the silver oxide which has been formed by the oxidizing effect of the decomposition of hydrogen peroxide on the silver and which continues to support catalytic action.

It is thus clear that there has been provided a catalyst arrangement which will support catalytic action well beyond the point where an ordinary permanganate catalyst will have broken down. It is, therefore, possible to employ such an arrangement in the propulsion system of torpedoes or other underwater devices where long runs are desired without the possibility of breakdown by reason of failure of the catalyst.

It has also been found during test runs that with the catalyst screen of the present arrangement, catalytic action during an initial run is successfully started at temperatures below freezing and, employing the same catalyst screen, in subsequent runs catalytic action is successfully started at temperatures in the neighborhood of 70° F.

An object of the present invention is to provide a new and improved catalyst for decomposing high-test hydrogen peroxide having the quality of producing substantially complete decomposition of the hydrogen peroxide and thereby producing a minimum of debris.

Another object of the invention is to provide a new and improved catalyst for decomposing hydrogen peroxide and having the characteristic of long life in service.

Still another object is to provide a new and improved catalyst for decomposing efficiently hydrogen peroxide at low temperatures.

A further object is to provide a new and improved catalyst for decomposing high-test hydrogen peroxide which is capable of maintaining high operating efficiency over a long period of time.

An additional object resides in the provision of a catalyst for decomposing hydrogen peroxide which combines the desired qualities of initial fast starting with long life.

Other objects and many of the attendant advantages of this invention will be readily appreciated as the same becomes better understood by reference to the following detailed description when considered in connection with the accompanying drawings wherein.

Figure 1:
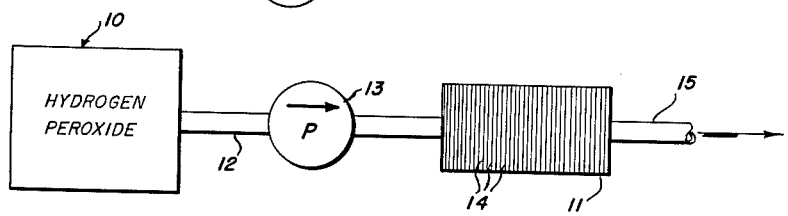
FIG. 1 is a diagrammatic view of apparatus suitable for decomposing hydrogen peroxide which employs the catalyst of the present invention.
Figure 2:
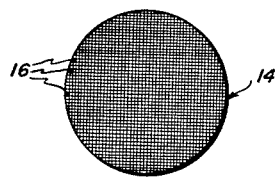
FIG. 2 is a view in elevation of the catalytic screen of the present invention.

Referring more particularly to the drawings wherein like numerals indicate like parts throughout the several views the numeral 10 indicates a supply tank containing hydrogen peroxide. A decomposition chamber 11 is connected to tank 10 by means of a conduit 12, a pump 13 being interposed between tank 10 and chamber 11 in conduit 12. Arranged within chamber 11 is a plurality of tightly clamped catalyst screens 14. The chamber 11 is provided with an outlet duct 15.

The screens 14 are preferably formed of steel wire 16 having a porous plating of silver, which may be applied by an electro-chemical process. A coating of metal permanganate is applied to the screen over the silver plating. The coating may be potassium, calcium, sodium, or other metal permanganate and may be applied in any manner suitable for the purpose such, for example, as by dipping the plated screen in a solution of the permanganate.

Figure 3:
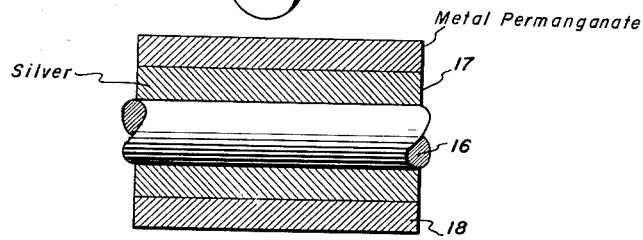
FIG. 3 is a sectional view of a portion of the wire employed in the screen and illustrating in exaggerated form the plating and coating thereon prior to the start of decomposition.

In operation, hydrogen peroxide is pumped from tank 10 into chamber 11 by means of pump 13 through duct 12. As the hydrogen peroxide enters chamber 11 it passes through the screens 14 which start the decomposition of the hydrogen peroxide. Prior to the start of decomposition, the wire 16 of which the screens 14 are formed appears as indicated in FIG. 3 having a plating of silver 17 and a coating of metal permanganate 18.

Figure 4:
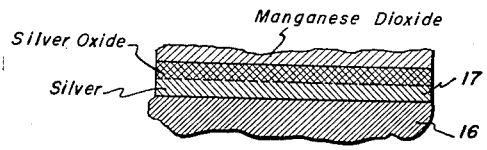
FIG. 4 is a view similar to FIG. 3 and illustrating the wire after the starting period.

As the decomposition continues, it being understood that the products of the decomposition of hydrogen peroxide are high temperature steam and oxygen, the permanganate is gradually dissolved and at the point of its adherence to the silver, manganese dioxide is formed adjacent the permanganate, while adjacent the silver, silver oxide is formed. At this point the coating and plating have the general arrangement as indicated in FIG. 4, the manganese dioxide now supporting the catalytic activation of the hydrogen peroxide.

Figure 5:
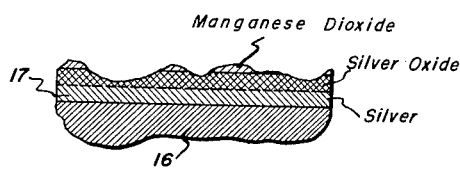
FIG. 5 is a view similar to FIG. 3 and illustrating the wire after portions of the manganese dioxide have worn away exposing the silver oxide.

As the decomposition continues, portions of the manganese dioxide are worn away by friction of the wires of the screen at their points of contact and by erosion caused by the high velocity of the gases passing through the screen. At this point the wire will have the approximate appearance as indicated in FIG. 5, the manganese dioxide being partially worn away exposing portions of the silver oxide. In this case decomposition is supported by both the silver oxide and the manganese dioxide.

It will thus be seen that there has been provided a catalytic screen which has good starting characteristics by reason of the use of a metal permanganate coating, and has long life and good operating characteristics after starting by reason of the exposure of the manganese dioxide and the subsequent exposure of portions of the silver oxide.

In preparing the catalytic screen, a steel wire mesh is electro-plated with silver in such a manner as to provide a porous surface thereto. The plated wire screen is coated with a metal permanganate and dried in an oven at a temperature of 100° C. to 110° C. After drying, the screen is ready for use as a catalyst activator for the decomposition of hydrogen peroxide.

It is to be understood that the catalyst of the present invention, while it has been described as being in the form of a screen, may also take the form of pellets or discs, if desired.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. A catalyst for promoting quick starting and continuous activation of the decomposition of hydrogen peroxide comprising, a base, a porous plating of silver on said base, and a baked coating of metal permanganate on said plating.

2. A catalyst for promoting quick starting and continuous decomposition of hydrogen peroxide comprising, a base, a porous plating of silver on said base, and a coating of metal permanganate on said plating.

3. A catalyst for promoting quick starting and continuous decomposition of hydrogen peroxide comprising, a metal screen having a porous silver plating and an outer coating of metal permanganate.

4. A catalyst for promoting the decomposition of hydrogen peroxide comprising, a steel screen, a porous plating of silver on said screen, a coating of potassium permangate on said plating.

5. The method of preparing a catalyst for decomposing hydrogen peroxide comprising the steps of electroplating a wire screen with silver whereby the plating is in a porous condition, coating said plated screen with a potassium permanganate solution, and drying said coated and plated screen in an oven at a temperature of 100° to 110° C.

References Cited in the file of this patent
UNITED STATES PATENTS

| | | |
|---|---|---|
| 1,871,004 | Lopez | Aug. 9, 1932 |
| 2,185,928 | Simpson et al. | Jan. 2, 1940 |
| 2,185,929 | Simpson et al. | June 2, 1940 |
| 2,474,183 | King | June 21, 1949 |
| 2,548,268 | Metsger | Apr. 10, 1951 |